United States Patent
Osako

(10) Patent No.: US 10,608,214 B2
(45) Date of Patent: Mar. 31, 2020

(54) BATTERY CONNECTOR, BATTERY MODULE, AND MANUFACTURING METHOD FOR BATTERY MODULE

(71) Applicant: Mitsubishi Electric Corporation, Chiyoda-ku (JP)

(72) Inventor: Yosuke Osako, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 141 days.

(21) Appl. No.: 15/770,217

(22) PCT Filed: Oct. 30, 2015

(86) PCT No.: PCT/JP2015/080847
§ 371 (c)(1),
(2) Date: Apr. 23, 2018

(87) PCT Pub. No.: WO2017/072974
PCT Pub. Date: May 4, 2017

(65) Prior Publication Data
US 2018/0309099 A1  Oct. 25, 2018

(51) Int. Cl.
*H01M 2/10* (2006.01)
*H01M 2/20* (2006.01)
(Continued)

(52) U.S. Cl.
CPC ........ *H01M 2/1016* (2013.01); *H01M 2/10* (2013.01); *H01M 2/202* (2013.01);
(Continued)

(58) Field of Classification Search
CPC .... H01M 2/1011; H01M 2/1016; H01M 2/20; H01M 2/06; H01M 2/202
See application file for complete search history.

(56) References Cited

U.S. PATENT DOCUMENTS 6,428,364 B2 * 8/2002 Saito ................ H01M 2/206
439/719
D813,814 S  3/2018 Osako
(Continued)

OTHER PUBLICATIONS

"Connectors, Minature, Electrical, Circular, Push-Pull Coupling, Removable Crimp Contacts, Based on Type DBAS", ESCC Detail Specification No. 3401/008, Issue 1, European Space Agency, Oct. 2002, 27 pages.

(Continued)

*Primary Examiner* — Jeremiah R Smith
(74) *Attorney, Agent, or Firm* — Oblon, McClelland, Maier & Neustadt, L.L.P.

(57) ABSTRACT

A first connector of a battery connector includes a battery-side busbar first terminal including a battery-side first pin insertion hole and a load-side busbar first terminal including a load-side first pin insertion hole. A second connector includes a battery-side busbar second terminal including a battery-side second pin insertion hole and a load-side busbar second terminal including a load-side second pin insertion hole. The load-side first pin insertion hole is formed in a position where the load-side first pin insertion hole does not match the battery-side second pin insertion hole when the battery-side busbar second terminal and the load-side busbar first terminal are superimposed. The load-side second pin insertion hole is formed in a position where the load-side second pin insertion hole does not match the battery-side first pin insertion hole when the battery-side busbar first terminal and the load-side busbar second terminal are superimposed.

11 Claims, 13 Drawing Sheets

(51) Int. Cl.
*H01M 10/04* (2006.01)
*H01M 10/0525* (2010.01)
*H01M 2/30* (2006.01)
*H01M 2/06* (2006.01)

(52) U.S. Cl.
CPC ..... *H01M 10/049* (2013.01); *H01M 10/0525* (2013.01); *H01M 2/06* (2013.01); *H01M 2/1011* (2013.01); *H01M 2/20* (2013.01); *H01M 2/30* (2013.01)

(56) References Cited

U.S. PATENT DOCUMENTS

| | | |
|---|---|---|
| D813,815 S | 3/2018 | Osako |
| D813,816 S | 3/2018 | Osako |
| 2014/0017542 A1* | 1/2014 | Suzuki ............... B62M 6/90 429/99 |
| 2016/0133890 A1* | 5/2016 | Lee ............... H01M 2/1077 429/72 |
| 2016/0197320 A1* | 7/2016 | Mack ............... H01M 10/0413 429/158 |
| 2016/0248068 A1* | 8/2016 | Ha ............... H01M 2/202 |
| 2019/0157652 A1* | 5/2019 | Mack ............... H01M 2/10 |

OTHER PUBLICATIONS

International Search Report dated Jan. 19, 2016 in PCT/JP2015/080847, filed on Oct. 30, 2015.

\* cited by examiner

BATTERY CONNECTOR, BATTERY MODULE, AND MANUFACTURING METHOD FOR BATTERY MODULE

FIELD

The present invention rely a battery connector for connecting a battery and a load, a battery module, and a manufacturing method for the battery module.

BACKGROUND

A battery module technology for housing, in a case, an assembled battery including a plurality of battery cells has been disclosed. In particular, in a battery module including an assembled battery used in the outer space, it is necessary to establish a special mounting method depending on a required machine environment condition.

To perform power line connection in a battery module, that is, to connect the battery module to a load, a round connector disclosed in Non Patent Literature 1 has been used. In the connection of the battery module to the load, necessary specifications are determined according to a required machine environment condition. A round connector adapted to the specifications is ordered. The necessary specifications include various requests such as assembling workability and prevention of misconnection. However, concerning a connector used for power line connection in a lithium ion battery used in the outer space, there are requirements such as various tests. For many connectors, a time required from order to delivery is one year or more. A very long time is required for the delivery of the connectors. Moreover, the connectors are expensive.

CITATION LIST

Non Patent Literature

Non Patent Literature 1: CONNECTORS, MINIATURE, ELECTRICAL, CIRCULAR, PUSH-PULL COUPLING, REMOVABLE CRIMP CONTACTS, BASED ON TYPE DBAS ESCC Detail Specification No. 3401/008 ISSUE 1 Oct. 2002

SUMMARY

Technical Problem

Therefore, in battery module, a reduction in the time required until the delivery of the battery connector and a reduction in cost have been problems.

The present invention has been devised in view of the above, and an object of the present invention is to obtain a low-cost battery connector that is easily prevented from being misconnected and is easily manufactured.

Solution to Problem

To solve the problems achieve the object, the present invention provides a battery connector including: a first connector to perform terminal connection on a negative electrode side; and a second connector to perform terminal connection on a positive electrode side. The first connector includes: a battery-side busbar first terminal connected to a negative electrode terminal of a battery and including a battery-side first pin insertion hole through which a first positioning pin is inserted; and a load-side busbar first terminal connected to a cable, which leads to a load, and including a load-side first pin insertion hole through which the first positioning pin is inserted. The second connector includes: a battery-side busbar second terminal connected to a positive electrode terminal of the battery and including a battery-side second pin insertion hole through which a second positioning pin is inserted; and a load-side busbar second terminal connected to a cable, which leads to the load, and including a load-side second pin insertion hole through which the second positioning pin is inserted. The load-side first pin insertion hole is formed in a position where the load-side first pin insertion hole matches the battery-side first pin insertion hole when the battery-side busbar first terminal and the load-side busbar first terminal are superimposed and does not match the battery-side second pin insertion hole when the battery-side busbar second terminal and the load-side busbar first terminal are superimposed. The load-side second pin insertion hole is formed in a position where the load-side second pin insertion hole matches the battery-side second pin insertion hole when the battery-side busbar second terminal and the load-side busbar second terminal are superimposed and does not match the battery-side first pin insertion hole when the battery-side busbar first terminal and the load-side busbar second terminal are superimposed.

Advantageous Effects of Invention

According to the present invention, there is an effect that it is possible to obtain a low-cost battery connector that is easily prevented from being misconnected and is easily manufactured.

DESCRIPTION OF EMBODIMENT

A battery connector, a battery module, and a manufacturing method for the battery module according to an embodiment of the present invention are explained in detail below with reference to the drawings. Note that the present invention is not limited by the embodiment.

Embodiment

Figure 1:
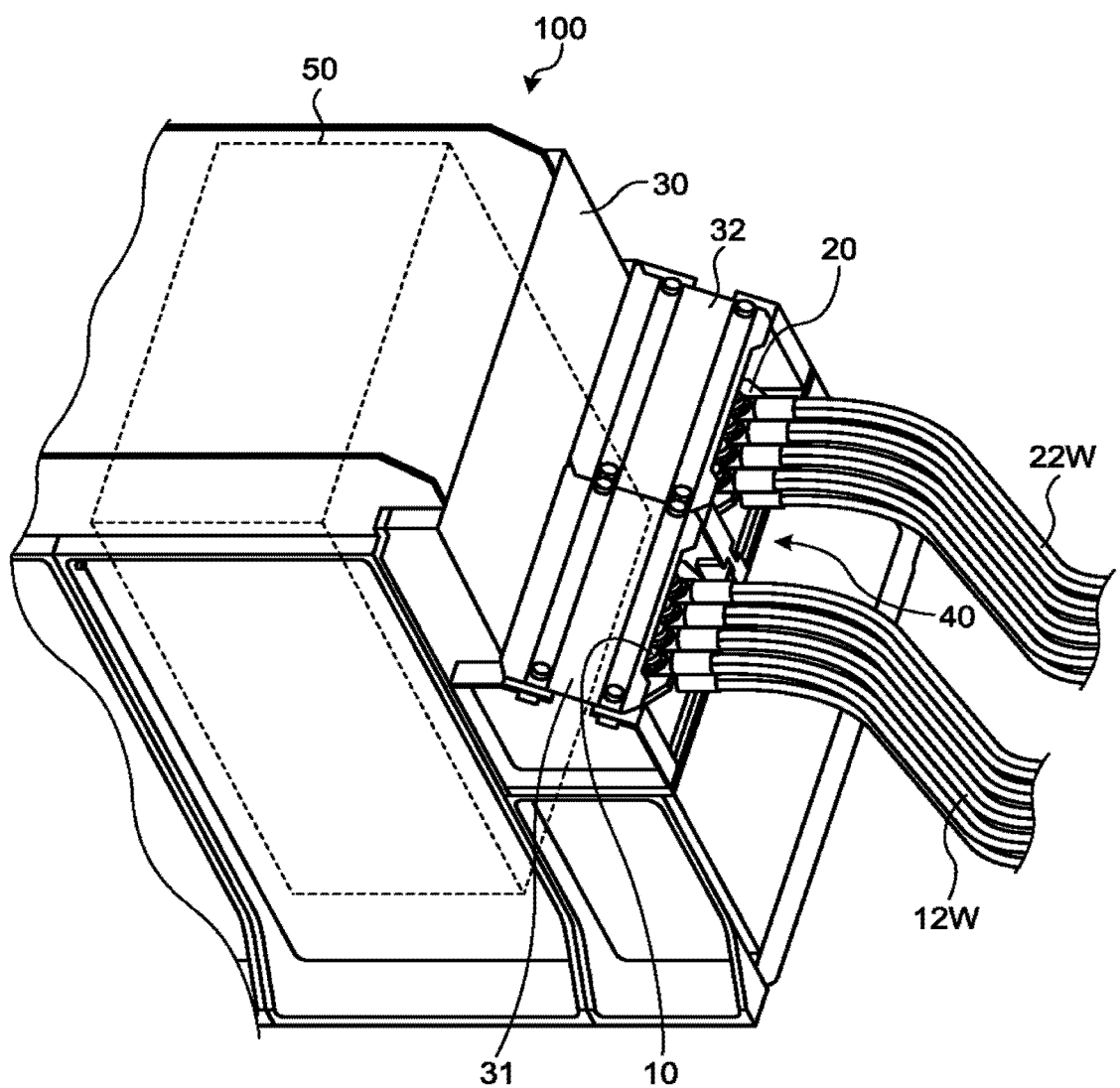
FIG. 1 is a perspective view of a battery module according to an embodiment of the present invention.
Figure 2:
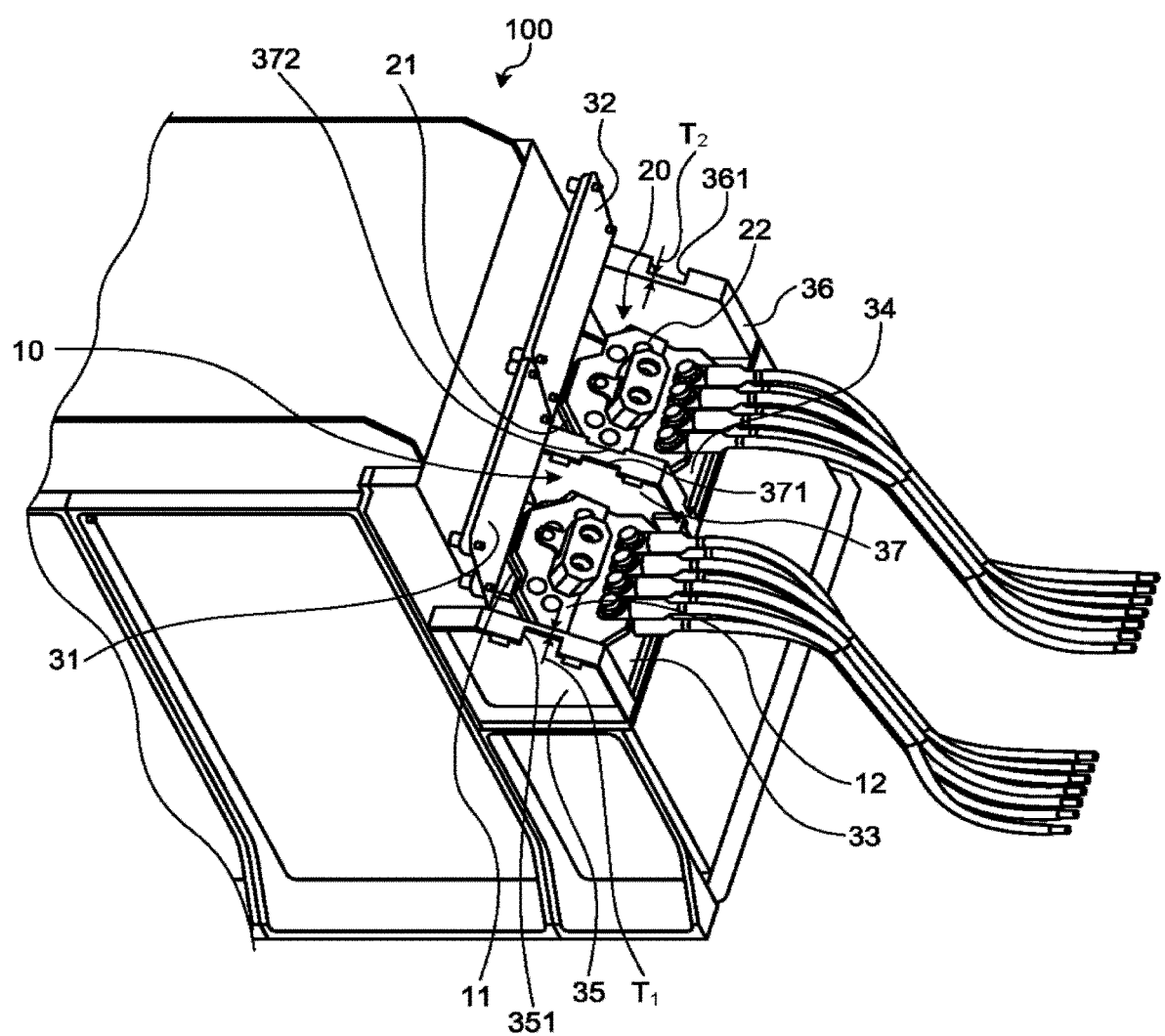
FIG. 2 is a perspective view of the battery module according to the embodiment of the present invention
Figure 3:
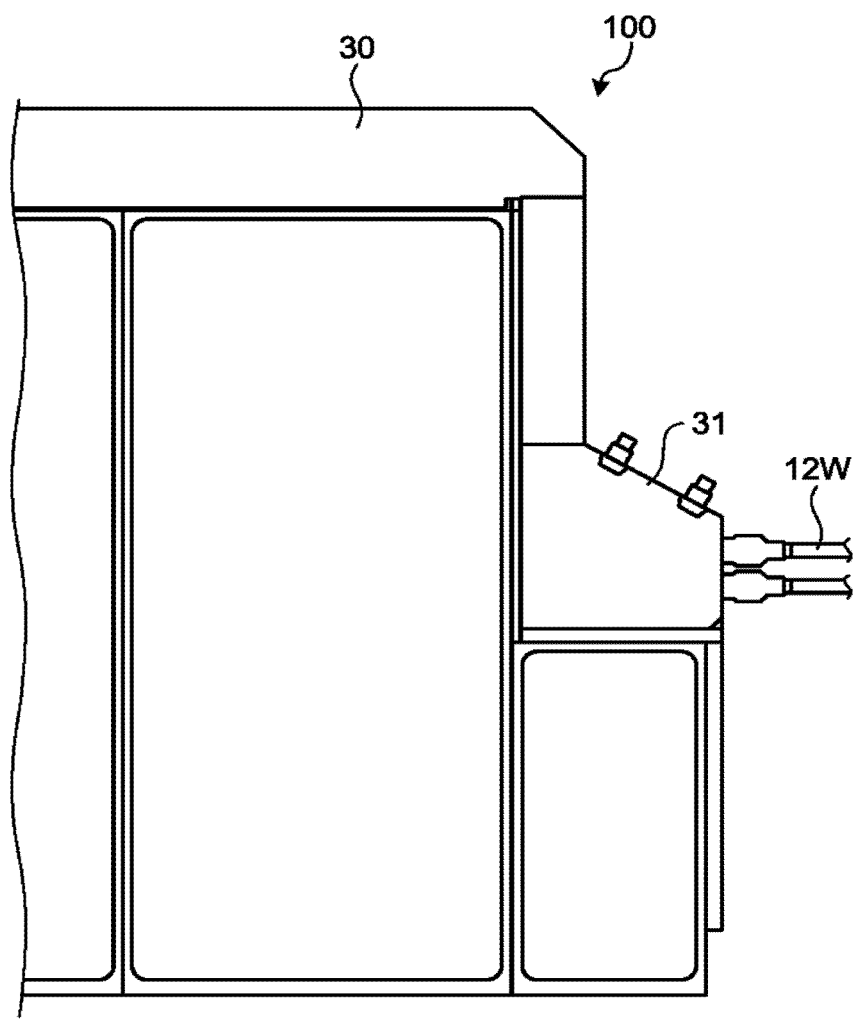
FIG. 3 is a side view of the battery module according to the embodiment.

FIG. 1 and FIG. 2 are perspective views of a battery module according to an embodiment of the present invention. FIG. 3 is a side view of the battery module according to the embodiment. FIG. 2 illustrates the battery module in a state in which connector covers 31 and 32 are opened. A battery module 100 includes a battery case 30, which houses a battery cell 50, and a battery connector 40 for connection of the battery cell 50 and a load. The battery case 30 includes the connector covers 31 and 32 that cover the battery connector 40. A lithium ion battery may be applied to the battery cell 50. However, the battery cell 50 is not limited to the lithium ion battery.

The battery connector 40 includes a first connector 10 for performing terminal connection on a negative electrode side of the battery cell 50 and a second connector 20 for performing terminal connection on a positive electrode side. The first connector 10 includes a battery-side busbar first terminal 11 connected to a negative electrode terminal of the battery cell 50 and a load-side busbar first terminal 12 connected to cables 12W, which lead to the load. The second connector 20 includes a battery-side busbar second terminal 21 connected to a positive electrode terminal of the battery cell 50 and a load-side busbar second terminal 22 connected to cables 22W, which leads to the load. The first connector 10 is set in a first connector setting region 33 of the battery case 30. The second connector 20 is set in a second connector setting region 34 of the battery case 30. A cutout 351 is provided on an outer sidewall 35 of the first connector setting region 33. A cutout 361 is provided on an outer sidewall 36 of the second connector setting region 34. On a partition wall 37 that partitions the first connector setting region 33 and the second connector setting region 34, a cutout 371 is provided on the first connector setting region 33 side and a cutout 372 is provided on the second connector setting region 34 side. The thickness of the outer sidewall 35 in a portion where the cutout 351 is provided is $T_1$. The thickness of the outer sidewall 36 in a portion where the cutout 361 is provided is $T_2$.

The first connector setting region 33 and the second connector setting region 34 are so differentiated as to be visually distinguishable. As a specific example, a colored tape such as a white tape is stuck to one of the first connector setting region 33 and the second connector setting region 34. Consequently, the first connector setting region 33 and the second connector setting region 34 can be easily visually distinguished. Note that tapes having different colors may be stuck to both of the first connector setting region 33 and the second connector setting region 34.

Figure 4:
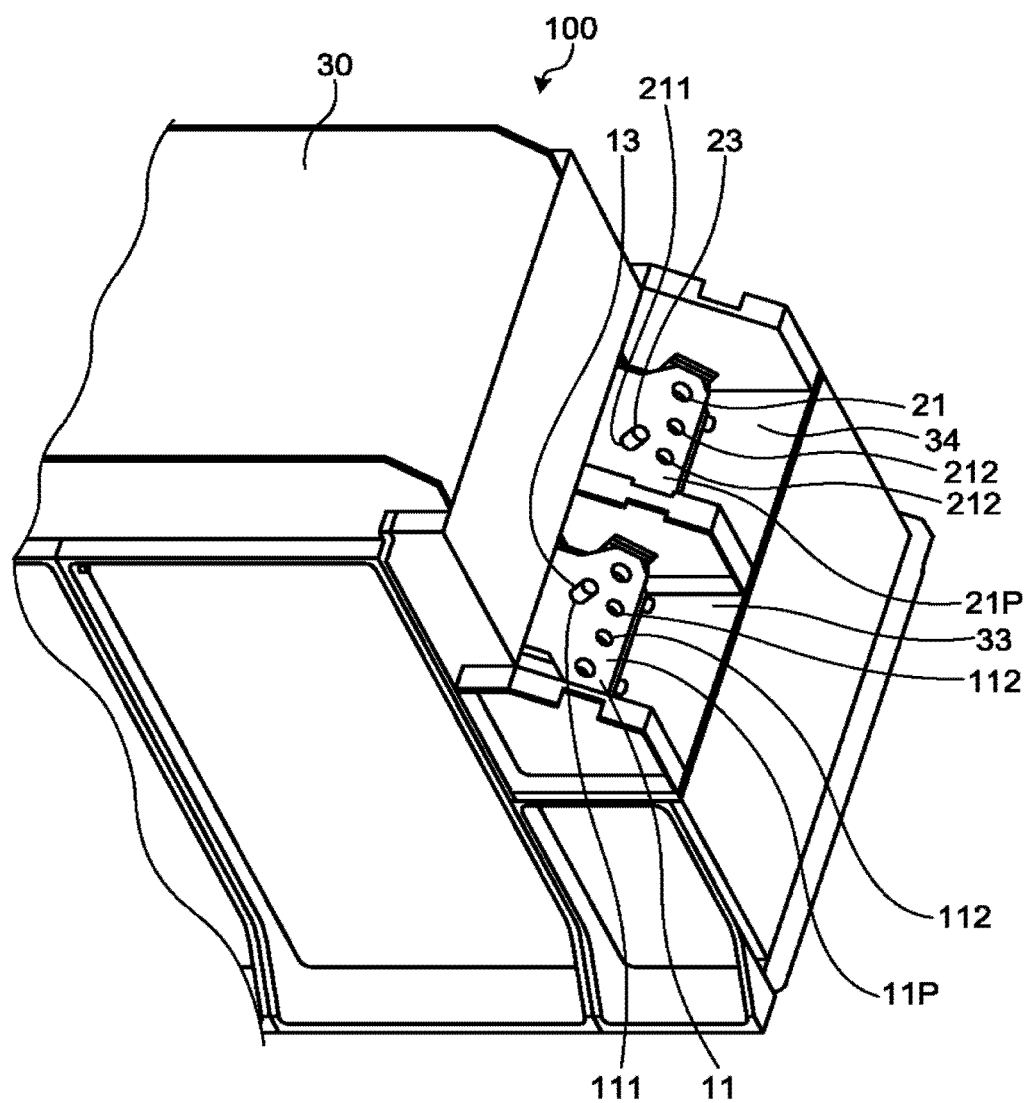
FIG. 4 is an exploded perspective view of the battery module according to the embodiment.
Figure 5:
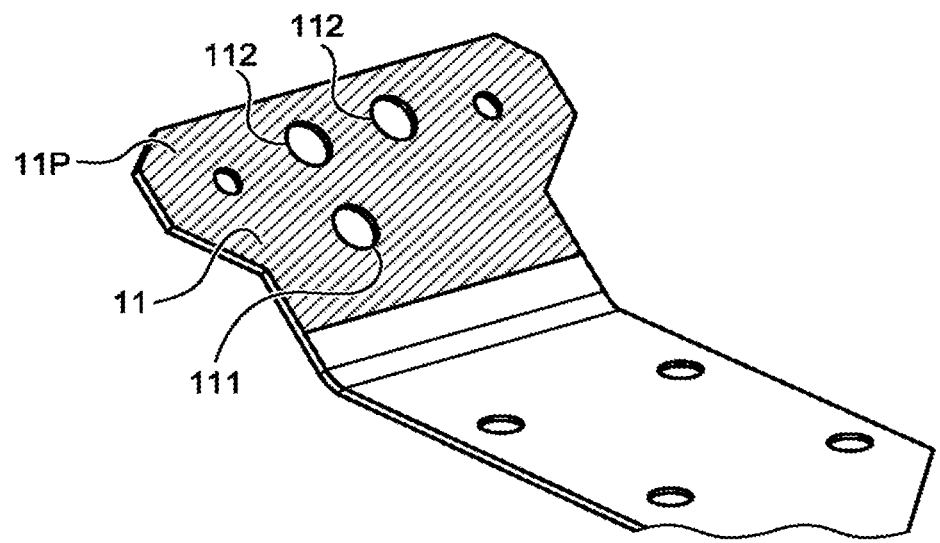
FIG. 5 is a diagram illustrating the configuration of a battery-side busbar first terminal of the battery module according to the embodiment.
Figure 6:
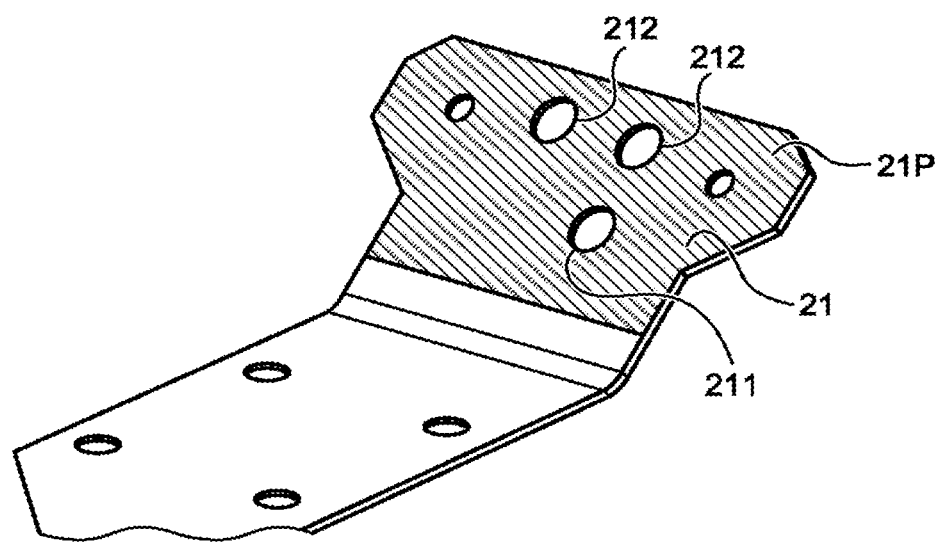
FIG. 6 is a diagram illustrating the configuration of a battery-side busbar second terminal of the battery module according to the embodiment.

FIG. 4 is an exploded perspective view of the battery module according to the embodiment. FIG. 5 is a diagram illustrating the configuration of the battery-side busbar first terminal of the battery module according to the embodiment. FIG. 6 is a diagram illustrating the configuration of the battery-side busbar second terminal of the battery module according to the embodiment. The battery-side busbar first terminal 11 includes a terminal plate 11P including a battery-side first pin insertion hole 111, which matches a first positioning pin 13 provided in the first connector setting region 33, and a first fixing screw hole 112. The battery-side busbar second terminal 21 includes a terminal plate 21P including a battery-side second pin insertion hole 211, which matches a second positioning pin 23 provided in the second connector setting region 34, and a second fixing screw hole 212. A copper plate applied with gold plating can be applied to the terminal plate 11P and the terminal plate 21P. However, metal plates of other materials may be used.

The first fixing screw hole 112 is configured by a plurality of screw holes provided spaced apart in asymmetrical positions with respect to the first pin insertion hole 111. The second fixing screw hole 212 is configured by a plurality of screw holes provided spaced apart in asymmetrical positions with respect to the second pin insertion hole 211.

Figure 7:
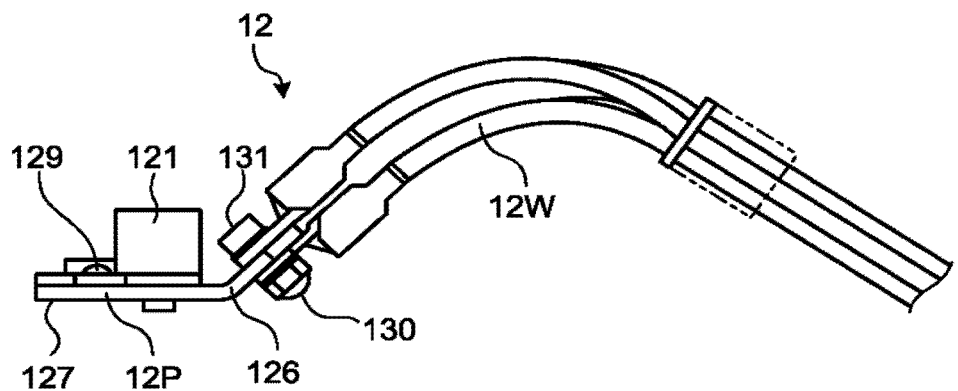
FIG. 7 is a side view illustrating the configuration of a load-side busbar first terminal of the battery module according to the embodiment.
Figure 8:
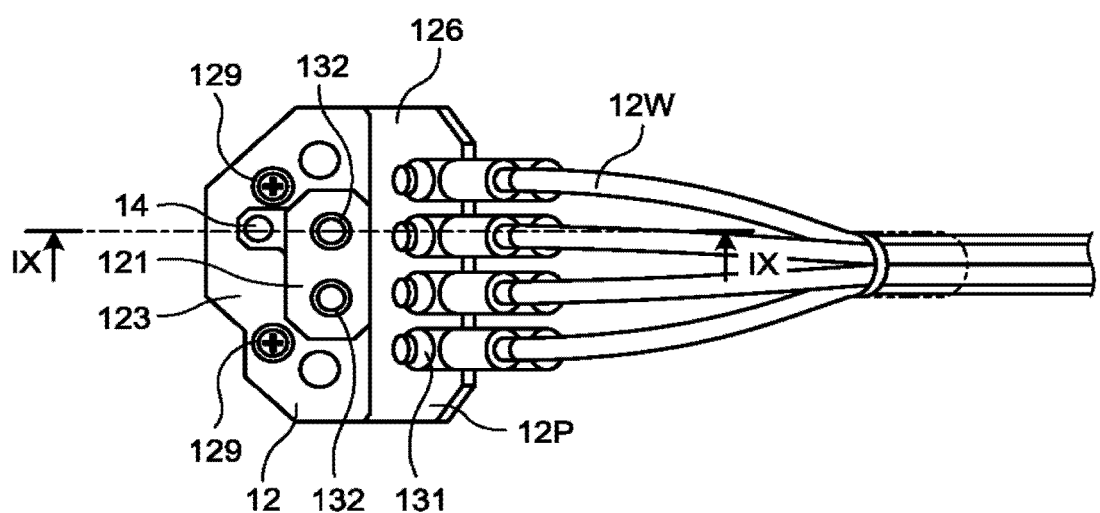
FIG. 8 is a plan view illustrating the configuration of the load-side bulbar first terminal of the battery module according to the embodiment.
Figure 9:
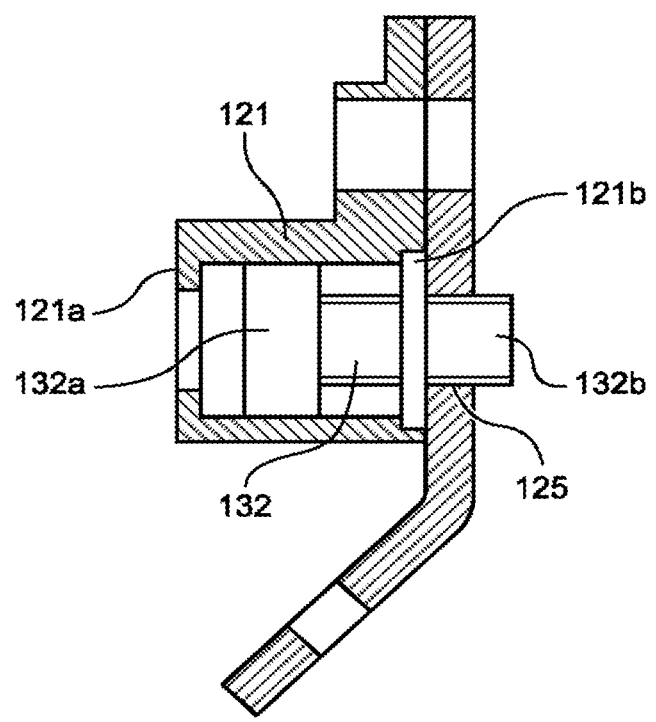
FIG. 9 is a sectional view of the load-side busbar first terminal of the battery module according to the embodiment.
Figure 10:
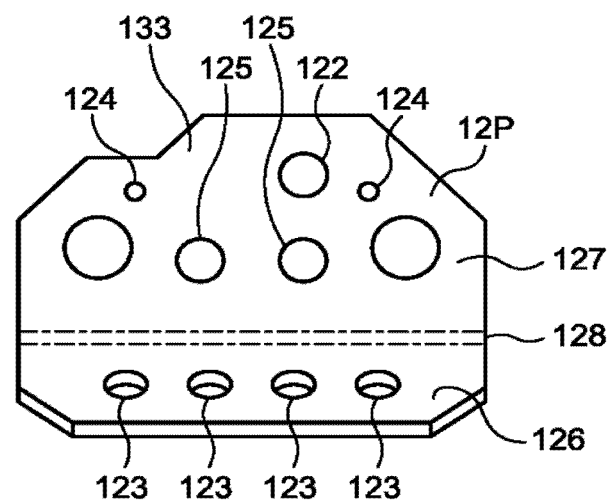
FIG. 10 is a plan view illustrating the structure of a terminal plate used in the load-side busbar first terminal of the battery module according to the embodiment.
Figure 11:
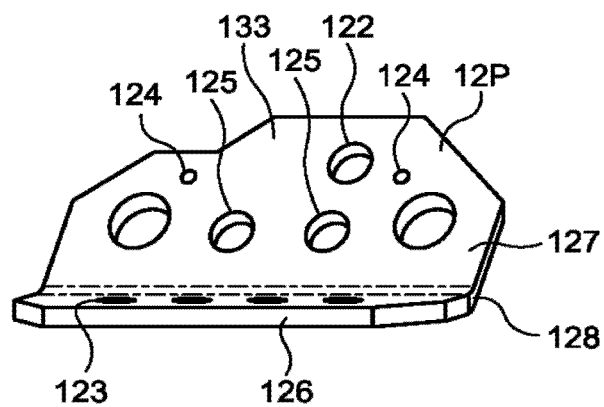
FIG. 11 is a perspective view illustrating the structure of the terminal plate used in the load-side busbar first terminal of the battery module according to the embodiment.

FIG. 7 is a side view illustrating the configuration of the load-side busbar first terminal of the battery module according to the embodiment. FIG. 8 is a plan view illustrating the configuration of the load-side busbar first terminal of the battery module according to the embodiment. FIG. 9 is a sectional view of the load-side busbar first terminal of the battery module according to the embodiment. FIG. 9 illustrates a cross section taken along a IX-IX line in FIG. 8. Note that, in FIG. 9, illustration of the cables 12W is omitted. FIG. 10 is a plan view illustrating the structure of a terminal plate used in the load-side busbar first terminal of the battery module according to the embodiment. FIG. 11 is a perspective view illustrating the structure of the terminal plate used in the load-side busbar first terminal of the battery module according to the embodiment. The load-side busbar first terminal 12 includes a terminal plate 12P to which the cables 12W leading to the load are connected, and a coupling section 121 for coupling with the battery-side busbar first terminal 11. The coupling section 121 includes anti-falling screws 132, which are first screws for fixing that screw in the first fixing screw holes 112. The inner side of the coupling section 121 is a hollow. A window hole 121*a* enough for receiving the distal end of a tool 60 explained below is opened in the upper surface of the coupling section 121. The size of the window hole 121*a* is smaller than the diameter of heads 132*a* of the anti-falling screws 132. Therefore, the anti-falling screws 132 are prevented from falling to the outside of the coupling section 121 through the window hole 121a. Washers 121b are inserted into the hollow of the coupling section 121 together with the anti-falling screws 132. Screw tips 132b of the anti-falling screws 132 pierce through the washers 121b. The diameter of the washers 121b is larger than the diameter of battery connection holes 125. Therefore, the anti-falling screws 132 are prevented from falling to the outside of the coupling section 121 through the battery connection holes 125.

The terminal plate 12P includes a load-side first pin insertion hole 122, cable fixing holes 123, coupling-section fixing holes 124 for fixing of the coupling section 121, and the battery connection holes 125 for fixing to the battery-side busbar first terminal 11. The terminal plate 12P includes a bent section 128 that segments a cable fixing section 126 and an energizing section 127. The cable fixing section 126 and the energizing section 127 are not disposed in the same plane. The coupling section 121 is fixed to the terminal plate 12P by coupling-section fixing screws 129. The cables 12W leading to the load are fixed to the cable fixing section 126 by screwing cable fixing screws 130, which pierce through the cable fixing holes 123, to cable fixing nuts 131. A hole 14 is provided in the coupling section 121 to overlap the load-side first pin insertion hole 122 to enable the first positioning pin 13 to pierce through the coupling section 121. Note that, if the first positioning pin 13 does not pierce through the coupling section 121, the hole 14 does not have to be provided. A copper material applied with gold plating can be applied to the terminal plate 12P. However, metal plates of other materials may be used.

In the energizing section 127, a first guide protrusion 133 is formed on a side opposed to the bent section 128.

Figure 12:
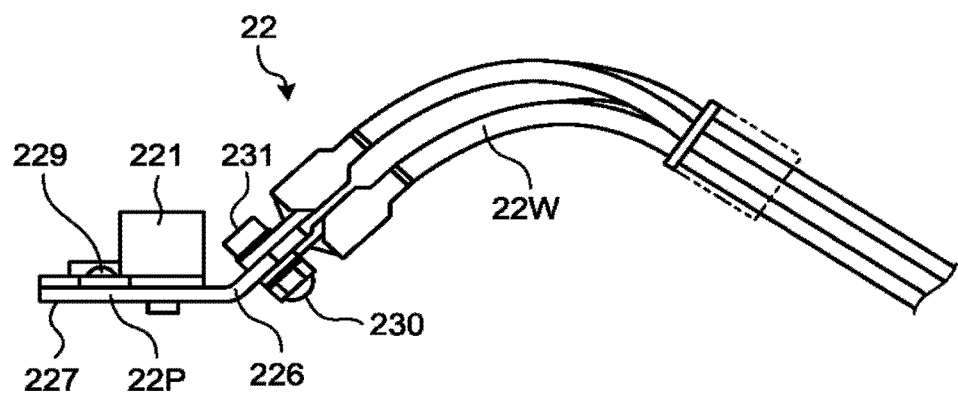
FIG. 12 is a side view illustrating the configuration of a load-side busbar second terminal of the battery module according to the embodiment.
Figure 13:
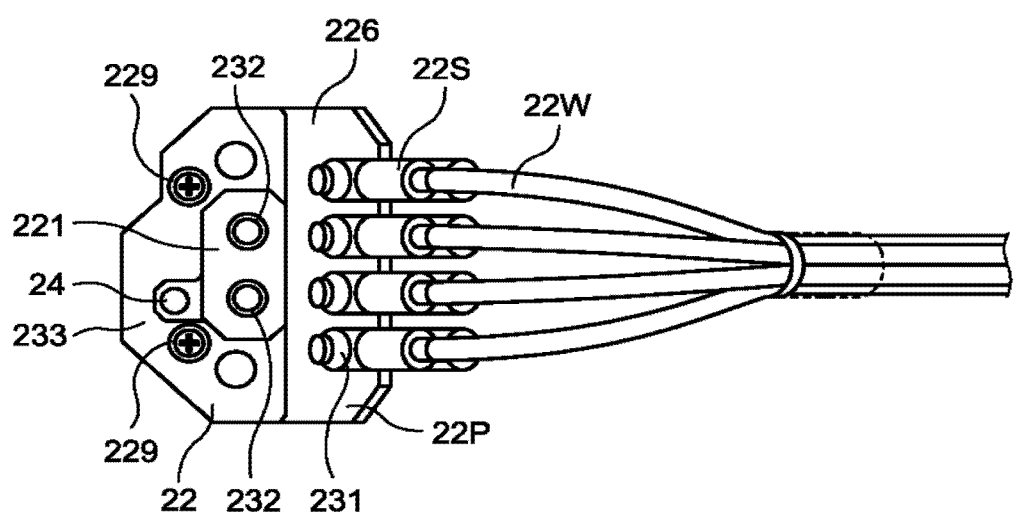
FIG. 13 is a plan view illustrating the configuration of the load-side busbar second terminal of the battery module according to the embodiment.
Figure 14:
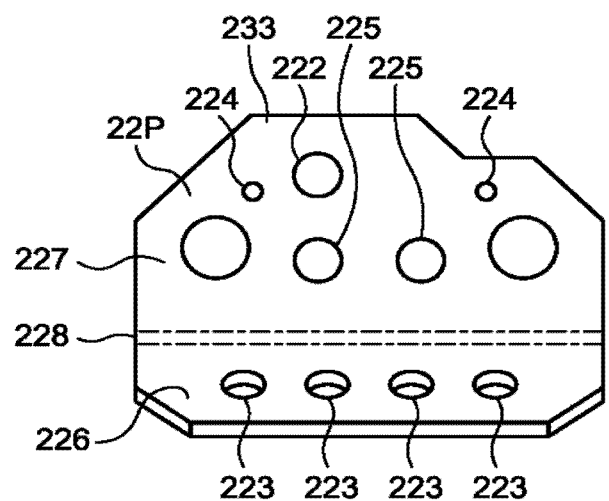
FIG. 14 is a plan view illustrating the structure of a terminal plate used in the load-side busbar second terminal of the battery module according to the embodiment.
Figure 15:
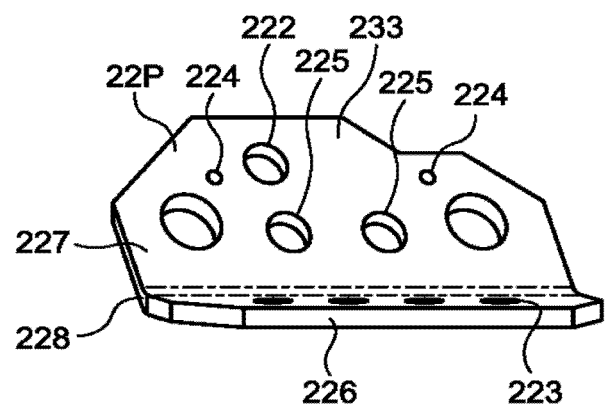
FIG. 15 is a perspective view illustrating the structure of the terminal plate used in the load-side busbar second terminal of the battery module according to the embodiment.

FIG. 12 is a side view illustrating the configuration of the load-side busbar second terminal of the battery module according to the embodiment. FIG. 13 is a plan view illustrating the configuration of the load-side busbar second terminal of the battery module according to the embodiment. FIG. 14 is a plan view illustrating the structure of a terminal plate used in the load-side bulbar second terminal of the battery module according to the embodiment. FIG. 15 is a perspective view illustrating the structure of the terminal plate used in the load-side busbar second terminal of the battery module according to the embodiment. The load-side busbar second terminal 22 includes a terminal plate 22P, to which the cables 22W leading to the load are connected, and a coupling section 221 for coupling to the battery-side busbar second terminal 21. The coupling section 221 includes anti-falling screws 232, which are second screws for fixing that screw in the second fixing screw holes 212. Although detailed explanation is omitted, the coupling section 221 has the same structure as the coupling section 121 illustrated in FIG. 9. The coupling section 221 includes a mechanism for preventing a fall of the anti-falling screws 232.

The terminal plate 22P includes a load-side second pin insertion hole 222, cable fixing holes 223, coupling-section fixing holes 224 for fixing of the coupling section 221, and battery connection holes 225 for fixing to the battery-side busbar first second terminal 21. The terminal plate 22P includes a bent section 228 that segments a cable fixing section 226 and an energizing section 227. The cable fixing section 226 and the energizing section 227 are not disposed in the same plane. The coupling section 221 is fixed to the terminal plate 22P by coupling-section fixing screws 229. The cables 22W leading to the load are fixed to the cable fixing section 226 by screwing cable fixing screws 230, which pierce through the cable fixing holes 223, to cable fixing nuts 231. A hole 24 is provided in the coupling section 221 to overlap the load-side second pin insertion hole 222 to enable the first second positioning pin 23 to pierce through the coupling section 22L Note that, if the second positioning pin 23 does not pierce through the coupling section 221, the hole 24 does not have to be provided. A copper material applied with gold plating can be applied to the terminal plate 22P. However, metal plates of other materials may be used.

In the energizing section 227, a second guide protrusion 233 is formed on a side opposed to the bent section 2228. The second guide protrusion 233 has a shape different from the shape of the first guide protrusion 133 of the load-side busbar first terminal 12.

Note that, in the embodiment, a plate material having the same shape can be formed as the terminal plate 12P and the terminal plate 22P by changing a bending direction. Therefore, it is possible to achieve a reduction in manufacturing cost through commonization of the components.

Figure 16:
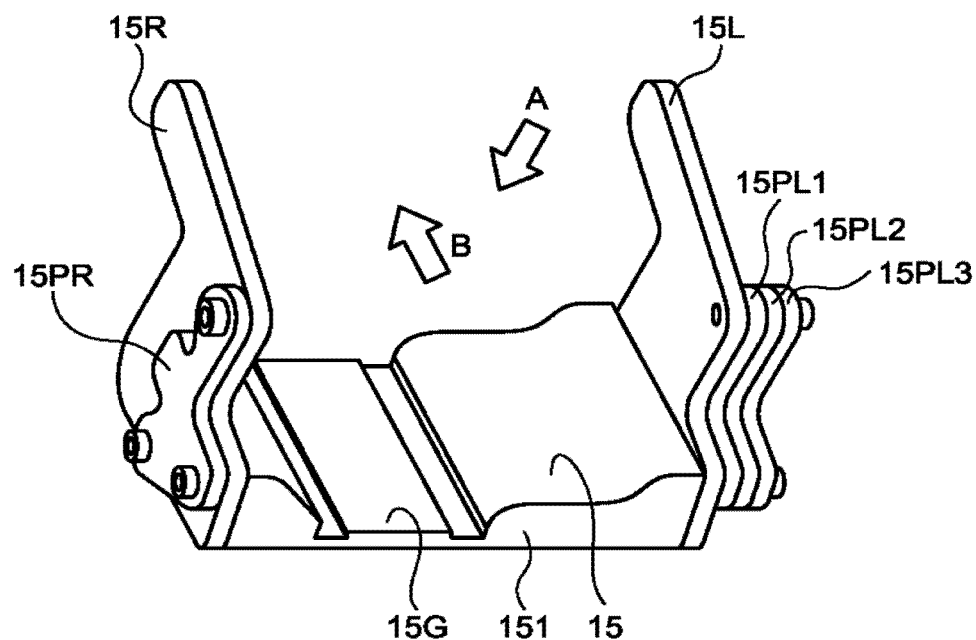
FIG. 16 is a diagram illustrating the configuration of a first guide block used during connection of a first connector of the battery module according to the embodiment.

FIG. 16 is a diagram illustrating the configuration of the first guide block used during connection of the first connector of the battery module according to the embodiment. A first guide block 15 includes a first holding section 151 in which a first guide groove 15G matching the first guide protrusion 133 is provided and leg sections 15L and 15R provided across the first holding section 151. In the leg section 15L, adjustment pieces 15PL are attached to the opposite surface of a surface opposed to the leg section 15R. In the leg section 15R, adjustment pieces 15PR1, 15PR2, and 15PR3 are provided on the opposite surface of a surface opposed to the leg section 15L.

Figure 17:
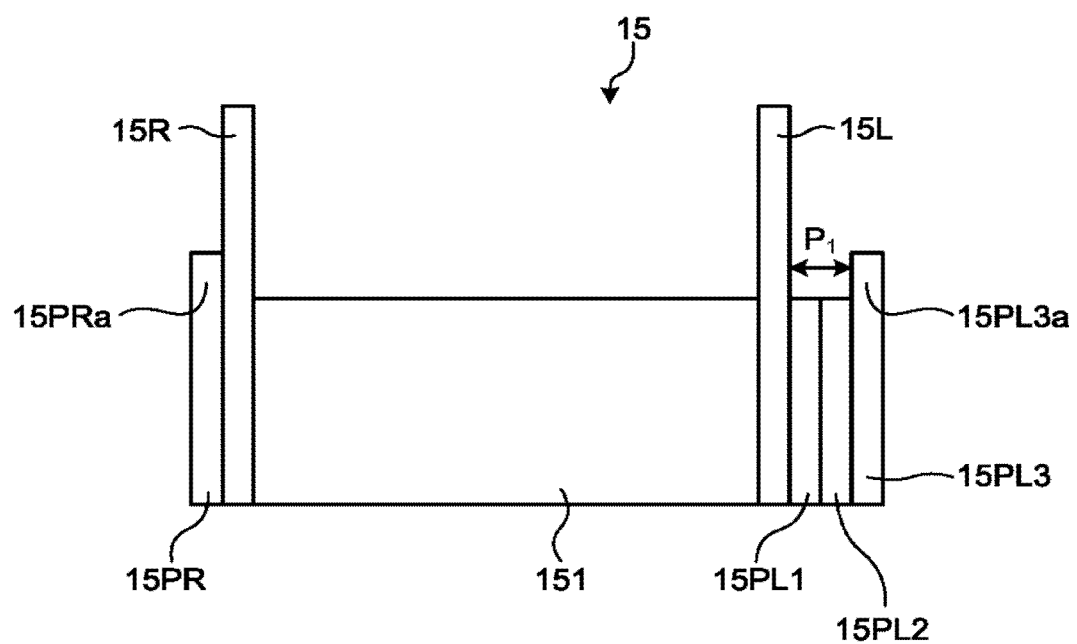
FIG. 17 is a plan view of the first guide block used during the connection of the first connector of the battery module according to the embodiment.

FIG. 17 is a plan view of the first guide block used during connection of the first connector of the battery module according to the embodiment. FIG. 17 illustrates a state viewed from an arrow A direction in FIG. 16. An adjustment piece 15PR includes a protrusion 15PRa that engages with the cutout 371. An adjustment piece 15PL3 includes a protrusion 15PL3a that engages with the cutout 351. Adjustment pieces 15PL1 and 15PL2 do not include a protrusion. A direction for mounting the first guide brook 15 in the first connector setting region 33 is a direction indicated by an arrow B in FIG. 16.

Figure 18:
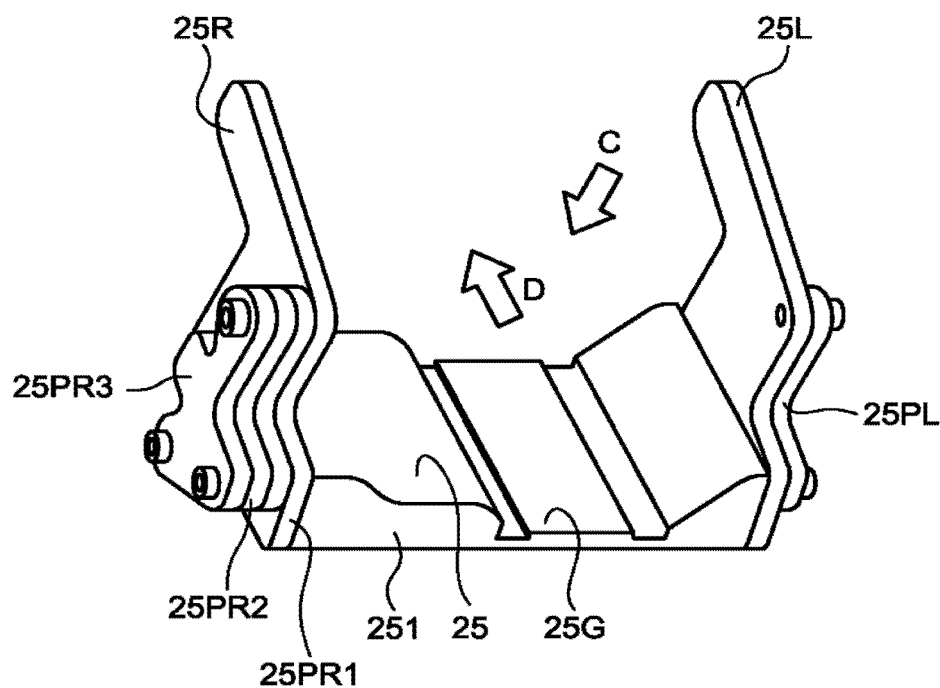
FIG. 18 is a diagram illustrating a second guide block used during connection of a second connector of the battery module according to the embodiment.

FIG. 18 is a diagram illustrating the configuration of a second guide block used during connection of the second connector of the battery module according to the embodiment. A second guide block 25 includes: a second holding section 251 in which a second guide groove G matching the second guide protrusion 233 is provided; and leg sections 25L and 25R that sandwich the second holding section 251. In the leg section 25L, adjustment pieces 25PL1, 25PL2, and 25PL3 are attached to the opposite surface of a surface opposed to the leg section 25R. In the leg section 25R, adjustment pieces 25PR are attached to the opposite surface of a surface opposed to the leg section 25L.

Figure 19:
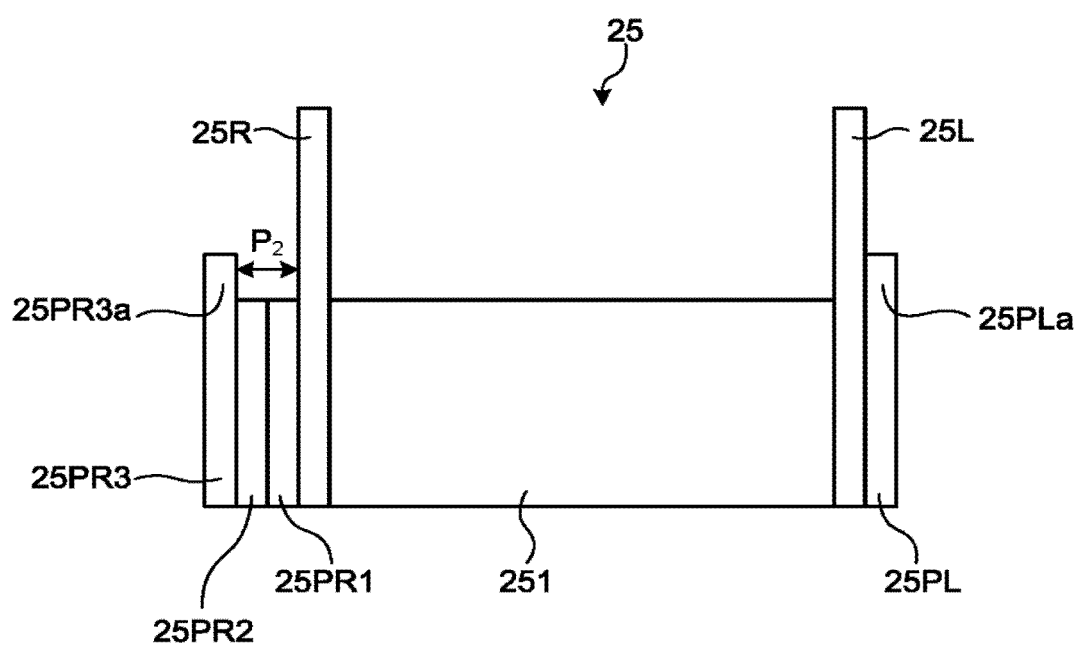
FIG. 19 is a plan view of the second guide block used during the connection of the second connector of the battery module according to the embodiment.

FIG. 19 is a plan view of the second guide block used during connection of the second connector of the battery module according to the embodiment. FIG. 19 illustrates a state viewed from an arrow C direction in FIG. 18. An adjustment piece 25PL includes a protrusion 25PLa that engages with the cutout 372. An adjustment piece 25PR3 includes a protrusion 25PR3a that engages with the cutout 361. Adjustment pieces 25PR1 and 25PR2 do not include a protrusion. A direction for mounting the second guide block 25 in the second connector setting region 34 is a direction indicated by an arrow D in FIG. 18.

Whereas an interval $P_1$ equivalent to the thickness of the adjustment pieces 15PL1 and 15PL2 is present between the leg section 15L and the protrusion 15PL3a, an interval is absent between the leg section 25L and the protrusion 25PLa. Whereas no interval is present between the leg section 15R and the protrusion 15PRa, an interval $P_2$ equivalent to the thickness of the adjustment pieces 25PR1 and 25PR2 is present between the leg section 25R and the protrusion 25PR3a. The interval $P_1$ between the leg section 15L and the protrusion 15PL3a is larger than thickness $T_1$ of the outer sidewall 35 in a portion where the cutout 351 is provided. The interval $P_2$ between the leg section 25R and the protrusion 25PR3a is larger than thickness $T_2$ of the outer sidewall 36 in a portion where the cutout 361 is provided.

Figure 20:
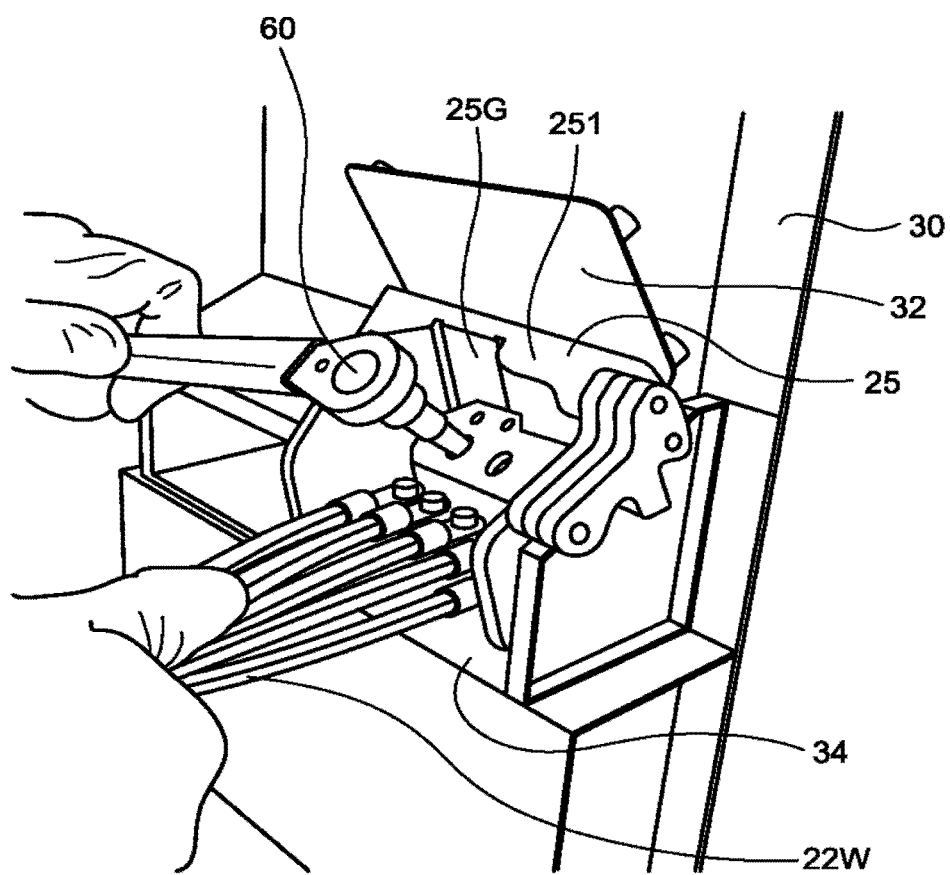
FIG. 20 is a diagram illustrating a state during connector connection work of the battery module according to the embodiment.

FIG. 20 is a diagram illustrating a state during connector connection work of the battery module according to the embodiment. The second guide block 25 is attached to the second connector setting region 34 of the battery case 30 in a state in which the connector cover 32 is opened. Because the interval $P_2$ between the leg section 25R and the protrusion 25PR3a is larger than thickness $T_2$ of the outer sidewall 36 in the portion where the cutout 361 is provided, when the second guide block 25 is attached to the second connector setting region 34, the protrusion 25PR3a engages with the cutout 361 and does not interfere with the outer sidewall 36.

Because the second guide block 25 is attached to the second connector setting region 34, the connector cover 32 is maintained in an open state by the second holding section 251. Therefore, there is no need to hold the connector cover 31 with a hand not to close during the connector connection work. In the second guide block 25, the second guide groove 25G is provided in the second holding section 251. Therefore, the load-side busbar second terminal 22 including the second guide protrusion 233 matching the second guide groove 25G can be superimposed on the battery-side busbar second terminal 21. However, the load-side busbar first terminal 12 including the first guide protrusion 133 interferes with the second guide block 25. Therefore, the load-side busbar first terminal 12 cannot be superimposed on the battery-side busbar second terminal 21.

After the load-side busbar second terminal 22 is superimposed on the battery-side busbar second terminal 21, the anti-falling screws 232 are rotated using the tool 60 such as a ratchet wrench and screwed in the second fixing screw holes 212 to fix the battery-side busbar second terminal 21 and the load-side busbar second terminal 22. Because the anti-falling screws 232 are housed in the coupling section 221, in a state in which the load-side busbar second terminal 22 is superimposed on the battery-side busbar second terminal 21 by one hand, the anti-falling screws 232 can be rotated and screwed by the other hand. Therefore, it is possible to easily perform work for fixing the load-side busbar second terminal to the battery-side busbar second terminal 21. Because the battery-side busbar second terminal and the load-side busbar second terminal 22 are in surface-contact, it is possible to realize a reduction in resistance of a connecting portion.

After the fixing of the battery-side busbar second terminal 21 and the load-side busbar second terminal 22 is completed, the second guide block 25 is detached from the second connector setting region 34. The connector cover 31 can be closed by detaching the second guide block 25. The second connector 20 is protected by the connector cover 31.

Although not illustrated in the figure, when the first guide block 15 is attached to the first connector setting region 33, similarly, the interval $P_1$ between the leg section 15L and the protrusion 15PL3a is larger than the thickness $T_1$ of the outer sidewall 35 in the portion where the cutout 351 is provided. Therefore, when the first guide block 15 is attached to the first connector setting region 33, the protrusion 15PL3a engages with the cutout 351 and does not interfere with the outer sidewall 35. When the first guide block 15 is attached to the first connector setting region 33, the connector cover 31 is maintained in an open state by the first holding section 151. In the first guide block 15, the first guide groove 15G is provided in the first holding section 151. Therefore, the load-side busbar first terminal 12 including the first guide protrusion 133 matching the first guide groove 15G can be superimposed on the battery-side busbar first terminal 11. However, the load-side busbar second terminal 22 including the second guide protrusion 233 interferes with the first guide block 15. Therefore, the load-side busbar second terminal 22 cannot be superimposed on the battery-side busbar first terminal 11.

After the load-side busbar first terminal 12 is superimposed on the battery-side busbar first terminal 11, the anti-falling screws 132 are rotated using the tool 60 such as a ratchet wrench and screwed to the first fixing screw holes 112 to fix the battery-side busbar first terminal 11 and the load-side busbar first terminal 12. Because the anti-falling screws 132 are housed in the coupling section 121, in a state in which the load-side busbar first terminal 12 is superimposed on the battery-side busbar first terminal 11 by one hand, the anti-falling screws 132 can be rotated and screwed by the other hand. Therefore, it is possible to easily perform work for fixing the load-side busbar first terminal to the battery-side busbar first terminal 11. Because the battery-side busbar first terminal 11 and the load-side busbar first terminal 12 are in surface-contact, it is possible to realize a reduction in resistance of a connecting portion.

After the fixing of the battery-side busbar first terminal 11 and the load-side busbar first terminal 12 is completed, the first guide block 15 is detached from the first connector setting region 33. The connector cover 31 can be closed by detaching the first guide block 15. The first connector 10 is protected by the connector cover 31.

Note that the number of the adjustment pieces 15PL1, 15PL2, and 15PL3 attached to the leg section 15L of the first guide block 15 and the number of the adjustment piece 25PL attached to the leg section 25L of the second guide block 25 are different. The number of the adjustment piece 15PR attached to the leg section 15R of the first guide block 15 and the number of the adjustment pieces 25PR1, 25PR2, and 25PR3 attached to the leg section 25R of the second guide block 25 are different. Therefore, even if the width of the first guide block 15 and the width of the second guide block are the same, the distance from the leg section 15L to the protrusion 15PL3a and the distance from the leg section 25L to the protrusion 25PLa are different. Similarly, the distance from the leg section 15R to the protrusion 15PRa and the distance from the leg section 25R to the protrusion 25PR3a are different.

Therefore, when it is attempted to attach the second guide block 25 to the first connector setting region 33, the protrusion 25PLa does not engage with the cutout 351 and interferes with the outer sidewall 35. The protrusion 25PR3a does not engage with the cutout 371 and interferes with the partition wall 37. Therefore, the second guide block 25 cannot be attached to the first connector setting region 33. Similarly, even if it is attempted to attach the first guide block 15 to the second connector setting region 34, the protrusion 15PRa does not engage with the cutout 361 and interferes with the outer sidewall 36. The protrusion 15PL3a does not engage with the cutout 372 and interferes with the partition wall 37. Therefore, the first guide block 15 cannot be attached to the second connector setting region 34.

By performing the connection work using the first guide block 15 and the second guide block 25, it is possible to physically suppress an act of superimposing the load-side busbar second terminal 22 the battery-side busbar first terminal 11 and an act of superimposing the load-side busbar first terminal 12 on the battery-side busbar second terminal 21. It is possible to prevent occurrence of misconnection. Note that, if it is possible to prevent the first guide block 15 from being attached to the second connector setting region 34 and prevent the second guide block 25 from being attached to the first connector setting region 33, the first guide block 15 and the second guide block 25 can be formed in shapes different from the shapes explained above.

As explained above, in the battery module according to the embodiment, the battery-side first pin insertion hole 111, through which the first positioning pin 13 provided in the first connector setting region 33 pierces, is provided in the battery-side busbar first terminal 11. The load-side first pin insertion hole through which the first positioning pin 13 pierces, is provided in the load star first terminal 12. Further, the battery-side second pin insertion hole 211, through which the second positioning pin 23 provided in the second connector setting region 34 pierces, is provided in the battery-side busbar second terminal 21. The load-side second pin insertion hole 222, through which the second positioning pin 23 pierces, is provided in the load-side busbar second terminal 22. Therefore, even if it is attempted to superimpose the load-side busbar second terminal 22 on the battery-side busbar first terminal 11, the first positioning pin 13 interferes with the load-side busbar second terminal 22. The load-side busbar second terminal 22 cannot be superimposed. Similarly, even if it is attempted to superimpose the load-side busbar first terminal 12 on the battery-side busbar second terminal 21, the second positioning pin 23 interferes with the load-side busbar first terminal 12. The load-side busbar first terminal 12 cannot be superimposed. Therefore, it is possible to prevent misconnection in which a positive electrode side of the load is connected to a negative electrode terminal of the battery cell 50 or a negative electrode side of the load is connected to a positive electrode terminal of the battery cell 50.

The battery-side busbar first terminal 11, the battery-side busbar second terminal 21, the load-side busbar first terminal 12, and the load-side busbar second terminal 22 can be manufactured by applying bending and boring to a metal plate. Therefore, it is possible to manufacture the battery module at low cost and in a short time. Because the battery module does not depend on a specific standard, it is easy to reduce a time for a completed product inspection.

In the battery module according to the embodiment, first, the asymmetrical cutout shapes 351, 361, 371, and 372 provided in the battery case 30 and asymmetrical projecting portions formed in the first guide block 15 and the second guide block 25 by the adjustment pieces 15PL1, 15PL2, 15PL3, 15PR, 25PL, 25PR1, 25PR2, and 25PR3 prevent the positive electrode side and the negative electrode side from being attached by mistake. In other words, the second guide block 25 is not attached to the first connector setting region 33 by mistake. The first guide block 15 is not attached to the second connector setting region 34 by mistake. Second, only the terminal plates 12P and 22P having shapes matching the respective shapes of the first guide block 15 and the second guide block 25 can be inserted. Therefore, it is possible to prevent misconnection. Third, the insertion of the terminal plates 12P and 22P is retrained by the positioning pins 13 and 23. Therefore, it is possible to prevent misconnection. Fourth, the colored tape is stuck to at least one of the first connector setting region 33 and the second connector setting region 34. Consequently, it is also possible to visually distinguish the first connector setting region 33 and the second connector setting region 34. Therefore, the battery module according to the embodiment includes a quadruple misconnection preventing mechanism by the first to fourth methods. It is possible to surely prevent misconnection.

Work for connecting the load-side busbar first terminal 12 to the battery-side busbar first terminal 11 and work for connecting the load-side busbar second terminal 22 to the battery-side busbar second terminal 21 are sometimes performed in a dark place in a satellite body structure or in an environment in which visibility is extremely low because cables are packed. Even in such an environment with low visibility, it is possible to prevent misconnection with the first to third methods.

A fall of screws during the connection work of the load-side busbar first terminal 12 and the battery-side busbar first terminal 11 and during the connection work of the load-side busbar second terminal 22 and the battery-side busbar second terminal 21, in other words, a situation in which screws fall into the satellite body structure to be lost is likely to spoil operation reliability of a satellite. However, the coupling section 121 includes an anti-falling function for screws. Therefore, it is possible to prevent a fall of screws.

The battery-side busbar first terminal 11 and the load-side busbar first terminal 12 are in surface contact and the battery-side busbar second terminal 21 and the load-side busbar second terminal 22 are in surface contact. Therefore, it is possible to prevent an increase in resistance in the connector portion.

The configurations explained in the embodiment indicate examples of the content of the present invention. The configurations can be combined with other publicly-known technologies. A part of the configurations can be omitted or changed in a range not departing from the gist of the present invention.

REFERENCE SIGNS LIST 10 first connector
11 battery-side busbar first terminal
11P, 12P, 21P, 22P terminal plate
12 load-side busbar first terminal
12W, 22W cable
13 first positioning pin
14, 24 hole
15 first guide block
15G first guide groove
15L, 15R, 25L, 25R leg section
15PL1, 15PL2, 15PL3, 15PR, 25PL, 25PR1, 25PR2, 25PR3 adjustment piece
15PL3a, 15PRa, 25PLa, 25PR3a protrusion
20 second connector
21 battery-side busbar second terminal
22 load-side busbar second terminal
23 second positioning pin
25 second guide block
25G second guide groove
30 battery case
31, 32 connector cover
33 first connector setting region
34 second connector setting region
35, 36 outer sidewall
37 partition wall
40 battery connector
50 battery cell 60 tool
100 battery module
111 battery-side first pin insertion hole
112 first fixing screw hole
121, 221 coupling section
121a window hole
121b washer
122 load-side first pin insertion hole
123, 223 cable fixing hole
124, 224 coupling-section fixing hole
125, 225 battery connection hole
126, 226 cable fixing section
127, 227 energizing section
128, 228 bent section
129, 229 coupling-section fixing screw
130, 230 cable fixing screw
131, 231 cable fixing nut
132, 232 anti-failing crew
132a screw head
132b screw tip
133 first guide protrusion
151 first holding section
211 battery-side second pin insertion hole
212 second fixing screw hole 222 load-side second pin insertion hole
233 second guide protrusion
251 second holding section
351, 361, 371, 372 cutout

The invention claimed is:

1. A battery connector comprising:
a first connector to perform terminal connection on a negative electrode side; and
a second connector to perform terminal connection on a positive electrode side, wherein
the first connector includes a battery-side busbar first terminal connected to a negative electrode terminal of a battery and including a battery-side first pin insertion hole through which a first positioning pin is inserted and a load-side busbar first terminal connected to a cable, which leads to a load, and including a load-side first pin insertion hole through which the first positioning pin is inserted,
the second connector includes a battery-side busbar second terminal connected to a positive electrode terminal of the battery and including a battery-side second pin insertion hole through which a second positioning pin is inserted and a load-side busbar second terminal connected to a cable, which leads to the load, and including a load-side second pin insertion hole through which the second positioning pin is inserted,
the load-side first pin insertion hole is formed in a position where the load-side first pin insertion hole matches the battery-side first pin insertion hole when the battery-side busbar first terminal and the load-side busbar first terminal are superimposed and does not match the battery-side second pin insertion hole when the battery-side busbar second terminal and the load-side busbar first terminal are superimposed, and
the load-side second pin insertion hole is formed in a position where the load-side second pin insertion hole matches the battery-side second pin insertion hole when the battery-side busbar second terminal and the load-side busbar second terminal are superimposed and does not match the battery-side first pin insertion hole when the battery-side busbar first terminal and the load-side busbar second terminal are superimposed.

2. The battery connector according to claim 1, wherein
the battery-side busbar first terminal includes a first fixing screw hole,
the battery-side busbar second terminal includes a second fixing screw hole,
the load-side busbar first terminal includes a first fixing screw that screws in the first screw hole for fixing, and
the load-side busbar second terminal includes a second fixing screw that screws in the second screw hole for fixing.

3. The battery connector according to claim 2, wherein the first fixing screw and the second fixing screw are anti-falling screws.

4. The battery connector according to claim 2, wherein
the first fixing screw hole is configured by a plurality of screw holes provided spaced apart in asymmetrical positions with respect to the battery-side first pin insertion hole, and
the second fixing screw hole is configured by a plurality of screw holes provided spaced apart in asymmetrical positions with respect to the battery-side second pin insertion hole.

5. The battery connector according to claim 1, wherein the battery-side busbar first terminal and the battery-side busbar second terminal are configured by metal plates.

6. A battery module comprising:
a battery cell including a negative electrode terminal and a positive electrode terminal;
a battery case to house the battery cell; and
a battery connector including a first connector to perform terminal connection on a negative electrode side on the negative electrode terminal and a second connector to perform terminal connection on a positive electrode side on the positive electrode terminal, wherein
the battery case includes a first connector setting region where a first positioning pin is provided and a second connector setting region where a second positioning pin is provided,
the first connector includes a battery-side busbar first terminal connected to a negative electrode terminal of a battery and including a battery-side first pin insertion hole and a load-side busbar first terminal connected to a cable, which leads to a load, and including a load-side first pin insertion hole,
the second connector includes a battery-side busbar second terminal connected to a positive electrode terminal of the battery and including a battery-side second pin insertion hole and a load-side busbar second terminal connected to a cable, which leads to the load, and including a load-side second pin insertion hole,
the load-side first pin insertion hole is formed in a position where the load-side first pin insertion hole matches the battery-side first pin insertion hole when the battery-side busbar first terminal and the load-side busbar first terminal are superimposed and does not match the battery-side second pin insertion hole when the battery-side busbar second terminal and the load-side busbar first terminal are superimposed,
the load-side second pin insertion hole is formed in a position where the load-side second pin insertion hole matches the battery-side second pin insertion hole when the battery-side busbar second terminal and the load-side busbar second terminal are superimposed and does not match the battery-side first pin insertion hole when the battery-side busbar first terminal and the load-side busbar second terminal are superimposed, when the battery-side busbar first terminal and the load-side busbar first terminal are superimposed and set in the first connector setting region, the first positioning pin pierces through the battery-side first pin insertion hole and the load-side first pin insertion hole, and when the battery-side busbar second terminal and the load-side busbar second terminal are superimposed and set in the second connector setting region, the second positioning pin pierces through the battery-side second insertion hole and the load-side second insertion hole.

7. The battery module according to claim 6, wherein the battery-side busbar first terminal includes a first fixing screw, the battery-side busbar second terminal includes a second fixing screw hole, the load-side busbar first terminal includes a first fixing screw that screws in the first screw hole for fixing, and the load-side busbar second terminal includes a second fixing screw that screws in the second screw hole for fixing.

8. The battery module according to claim 7, wherein the first fixing screw and the second fixing screw are anti-falling screws.

9. The battery module according to claim 7, wherein the first fixing screw hole is configured by a plurality of screw holes provided spaced apart in asymmetrical positions with respect to the battery-side first pin insertion hole, and the second fixing screw hole is configured by a plurality of screw holes provided spaced apart in asymmetrical positions with respect to the battery-side second pin insertion hole.

10. The battery module according to claim 6, wherein the battery-side busbar first terminal and the battery-side busbar second terminal are configured by metal plates.

11. A manufacturing method for the battery module according to claim 6, the manufacturing method comprising, when superimposing the load-side busbar first terminal on the battery-side busbar first terminal, using, as a jig, a first guide block that causes interference with the battery-side busbar second terminal to prevent the battery-side busbar second terminal from being superimposed on the load-side busbar first terminal and, when superimposing the load-side busbar second terminal on the battery-side busbar second terminal, using, as the jig, a second guide block that causes an interference with the battery-side busbar first terminal to prevent the battery-side busbar first terminal from being superimposed on the load-side busbar second terminal.

* * * * *